(No Model.) 2 Sheets—Sheet 1.

J. B. POWELL.
SPRING MOTOR.

No. 246,197. Patented Aug. 23, 1881.

Witnesses
Hubert Howson
Harry Smith

Inventor
John B. Powell
by his Attorneys
Howson and Son (No Model.) 2 Sheets—Sheet 2.

J. B. POWELL.
SPRING MOTOR.

No. 246,197. Patented Aug. 23, 1881.

Witnesses:—
Harry Smith
Hubert Howson

Inventor,
John B. Powell
by his Attorneys
Howson and Sons

UNITED STATES PATENT OFFICE.

JOHN B. POWELL, OF PHILADELPHIA, PENNSYLVANIA, ASSIGNOR OF ONE-THIRD TO JAMES H. HARPER, OF SAME PLACE.

SPRING-MOTOR.

SPECIFICATION forming part of Letters Patent No. 246,197, dated August 23, 1881.

Application filed February 1, 1881. (No model.)

*To all whom it may concern:*

Be it known that I, JOHN B. POWELL, a citizen of the United States, residing in Philadelphia, Pennsylvania, have invented certain Improvements in Spring-Motors, of which the following is a specification.

My invention relates to that class of spring-motors in which a series of barrels containing springs and a series of arbors are so combined that the measure of power obtained from the whole of the springs is equivalent to that obtained from one spring only, while the continuance of the power obtained will be proportionate to the number of springs used; and the main object of my invention is to so combine a series of barrels and their springs and a series of arbors or shafts with a permanent frame-work that there shall be perfect lateral steadiness of the bearings and a consequent avoidance of undue friction.

Figure 1:
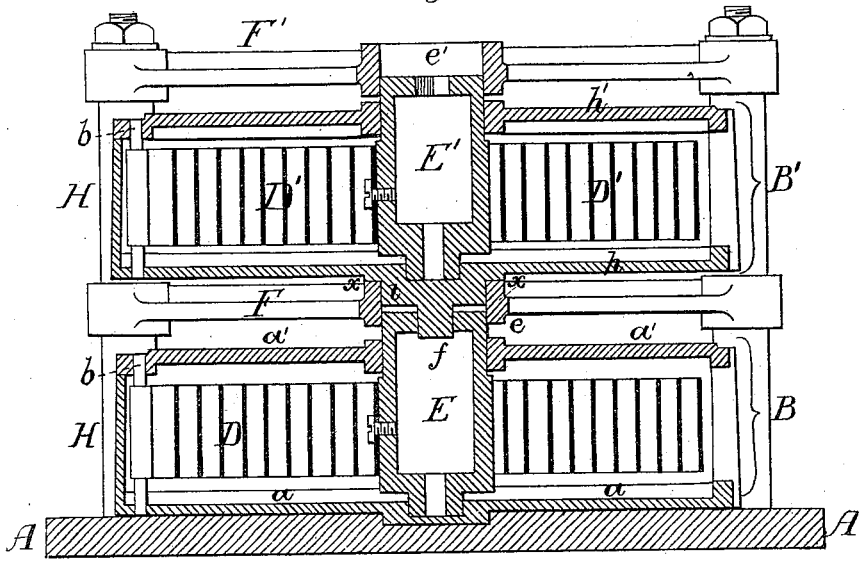
Figure 3:
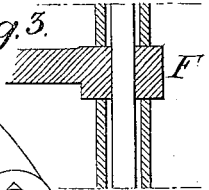
Figure 2:
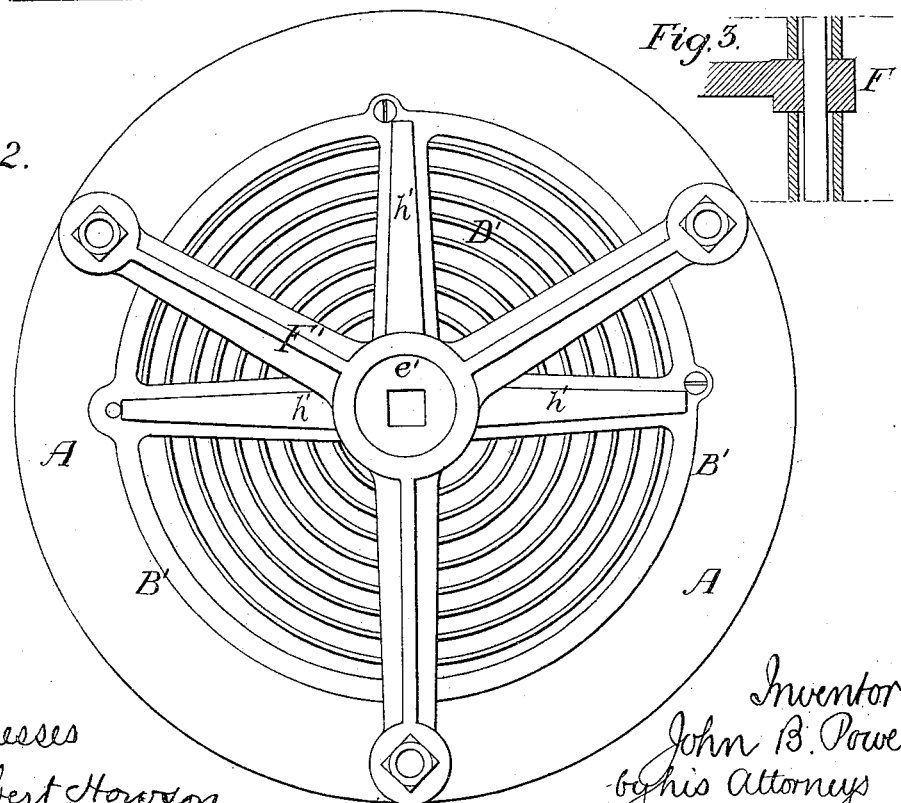
Figure 4:
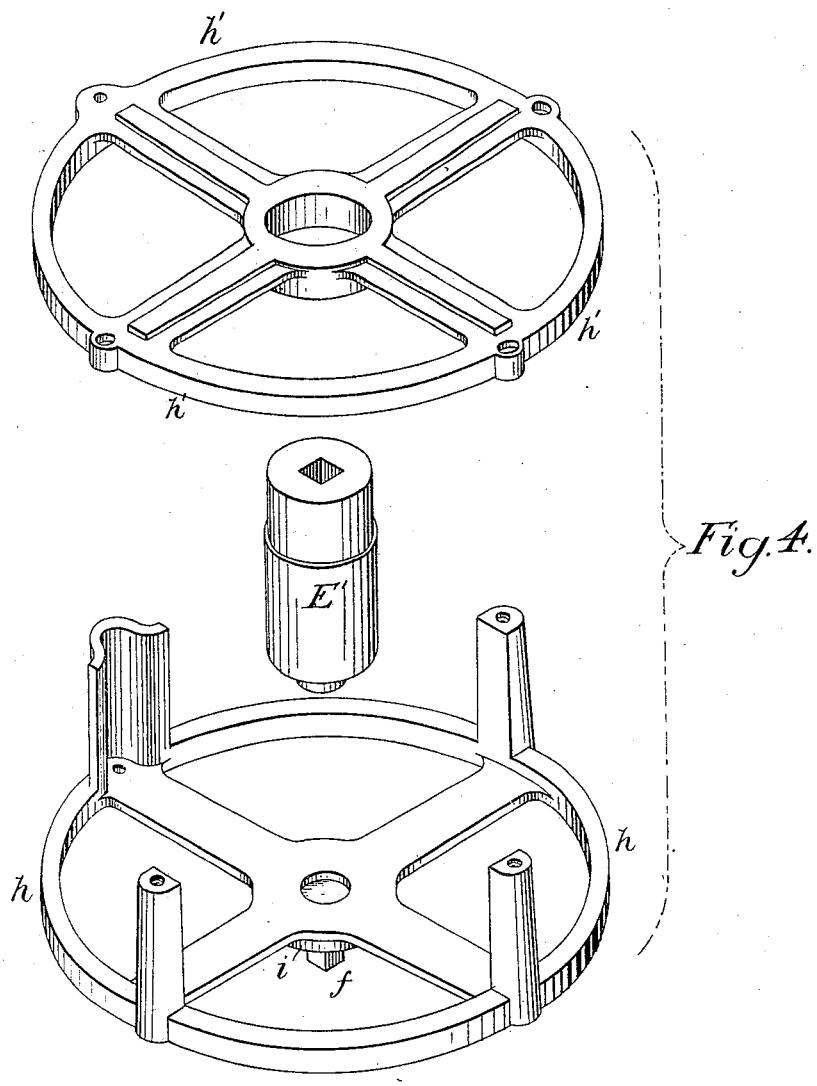

In the accompanying drawings, Figure 1, Sheet 1, is a vertical section of sufficient of a spring-motor to illustrate my improvements; Fig. 2, a plan view; Fig. 3, a detached view of part of the frame; and Fig. 4, Sheet 2, a perspective view of the two parts of one of the barrels and a shaft detached from each other.

To the base A of the motor is secured the plate $a$ of the first barrel, B, of which $a'$ is the upper plate; and between the two plates, but free from contact therewith, is the coiled spring D, one end of the latter being attached to a pin, $b$, passing through the barrel near the periphery of the same, and the other end of the spring being secured to the first central shaft or arbor, E, which is preferably made hollow, as shown, the shaft being loose in the upper plate, $a'$, of the barrel, the lower end having its bearing in a recess in the lower plate, $a$, and its upper bearing in the central hub, $e$, of the cross-frame F, which, in the present instance, consists of three arms secured to the three pillars, H, on the base A.

The second barrel, B', and its spring are substantially the same as the first; but, instead of being fixed, it must be capable of revolving, its journal $i$ projecting from the lower plate, $h$, into the hub $e$ of the cross-frame F, and the barrel bearing at $x$ on the top of the said hub. This second barrel is connected, by a coiled spring similar to that of the first barrel, to a second shaft or arbor, E', which is loose in the upper plate, $h'$, of the said second barrel, and has its upper bearing in the central hub, $e'$, of a second cross-frame, F', and its lower bearing in the plate $h$ of the upper barrel; and this plate has a central projection, $f$, fitting freely into a recess or orifice in the upper end of the shaft E, the projection and orifice being of a square or such other form that the upper barrel cannot turn without the lower shaft. The journal $i$ of the upper barrel is not in contact with the top of the shaft E, for every barrel throughout the motor should have a separate support on the permanent frame of the machine, and this frame admits of being constructed in different styles; but I prefer the cross-frames and pillars as the simplest and most economical plan, each pillar being composed of sections of tubes and a central bolt, as shown in Fig. 3, and the cross-frames being confined between the tubes by the nut of the bolt.

It will be seen that steadiness of the shafts E and E' must always be maintained by the fixed frames in which the said shafts have their bearings, and this is of especial importance in machines of this class, as a very slight lateral strain on one or more of the shafts would impart such friction in their bearings as to detract seriously from the power exerted by the springs.

Although I have shown but two barrels, each containing a spring, a complete motor will generally contain four or more barrels. Indeed, any desired number of barrels may be combined with the lower fixed barrel by repetitions of the barrel B' and its spring and the shafts E', and by adding additional cross-frames to the frame-work.

Although the shafts are not in contact with each other, the springs and barrels will so operate that the measure of power obtained from the whole of the springs will be equivalent to that derived from one spring only, while the continuance of the power obtained will be proportionate to the number of springs used.

Power may be transmitted from the uppermost shaft of the series to a sewing or other machine by suitable driving appliances.

The mechanism for winding up the springs of the motor may be varied. That shown in Patent No. 219,015, April 26, 1879, may, for instance, be used.

I claim as my invention—

1. A spring-motor in which a series of barrels and shafts, each barrel connected to one shaft by a spring and the barrel of one shaft being coupled to the shaft of the adjoining barrel so as to rotate therewith, are combined with a fixed frame, affording separate bearings and supports for the several barrels, all substantially as set forth.

2. The combination, in a spring-motor, of barrel D' and shaft E', connected together by a coiled spring, the shaft having one bearing in a fixed frame and the other in the said barrel, and the barrel having a journal adapted to a bearing in and supported by the said fixed frame, and means for coupling the said barrel to the shaft of an adjoining barrel, all substantially as specified.

3. The combination of the within-described system of barrels, springs, and shafts with a frame composed of a base, cross-frames, and pillars, consisting of sections of tubes and bolts, substantially as specified.

In testimony whereof I have signed my name to this specification in the presence of two subscribing witnesses.

JOHN B. POWELL.

Witnesses:
JAMES F. TOBIN,
HARRY SMITH.